(12) United States Patent
Shiokawa et al.

(10) Patent No.: US 11,338,668 B2
(45) Date of Patent: May 24, 2022

(54) FUEL FILLER PIPE

(71) Applicant: KEYLEX CORPORATION, Hiroshima (JP)

(72) Inventors: Tomoyuki Shiokawa, Hiroshima (JP); Atsushi Nakasaki, Hiroshima (JP)

(73) Assignee: Keylex Corporation, Hiroshima (JP)

( * ) Notice: Subject to any disclaimer, the term of this patent is extended or adjusted under 35 U.S.C. 154(b) by 0 days.

(21) Appl. No.: 17/130,677

(22) Filed: Dec. 22, 2020

(65) Prior Publication Data

US 2021/0107353 A1 Apr. 15, 2021

Related U.S. Application Data

(63) Continuation of application No. PCT/JP2019/016559, filed on Apr. 18, 2019.

(30) Foreign Application Priority Data

| Jun. 27, 2018 | (JP) | JP2018-121791 |
| Jun. 27, 2018 | (JP) | JP2018-121811 |
| Jun. 27, 2018 | (JP) | JP2018-121832 |

(51) Int. Cl.
*B60K 15/04* (2006.01)
*B60K 15/03* (2006.01)
*B60K 15/035* (2006.01)

(52) U.S. Cl.
CPC ........... *B60K 15/0406* (2013.01); *B60K 2015/03447* (2013.01); *B60K 2015/03453* (2013.01);
(Continued)

(58) Field of Classification Search
CPC ........... B60K 15/0406; B60K 15/04; B60K 2015/03538; B60K 2015/047;
(Continued)

(56) References Cited

U.S. PATENT DOCUMENTS 8,820,562 B2 * 9/2014 Kito ............... B60K 15/077
  220/86.2
9,394,157 B2 * 7/2016 Kito ............... B29C 66/545
(Continued)

FOREIGN PATENT DOCUMENTS

CN 201415942 Y 3/2010
CN 101868368 A 10/2010
(Continued)

OTHER PUBLICATIONS

International Search Report dated Jul. 23, 2019 from corresponding International Patent Application No. PCT/JP2019/016559, 5 pages.
(Continued)

*Primary Examiner* — Nicolas A Arnett
(74) *Attorney, Agent, or Firm* — Ohlandt, Greeley, Ruggiero & Perle, L.L.P.

(57) ABSTRACT

A tubular fuel filler pipe body is a blow molded body and is adapted to connect to a fuel tank at one end thereof. The fuel filler pipe body includes in an outer circumferential surface of another end side thereof an annular recessed groove. The fuel filler pipe body includes an opening of the other end thereof to which a nozzle guide is mounted. The nozzle guide includes on an one end side thereof an annular covering portion configured to cover annularly the outer circumferential surface of the other end side of the fuel filler pipe body. An annular rubber sealing member configured to seal between an inner circumferential surface of the annular recessed groove and an inner circumferential surface of the annular covering portion fits with the annular recessed groove.

7 Claims, 6 Drawing Sheets

(52) U.S. Cl.
 CPC ........... *B60K 2015/03538* (2013.01); *B60K 2015/047* (2013.01); *B60K 2015/0419* (2013.01); *B60K 2015/0477* (2013.01)

(58) Field of Classification Search
 CPC .......... B60K 2015/03447; B60K 2015/03453; B60K 2015/0419; B60K 2015/0477
 See application file for complete search history.

(56) References Cited

U.S. PATENT DOCUMENTS

| | | | | |
|---|---|---|---|---|
| 9,597,955 | B2* | 3/2017 | Ushigome | B60K 15/04 |
| 9,718,349 | B2* | 8/2017 | Kito | B60K 15/04 |
| 9,855,840 | B2* | 1/2018 | Kito | B60K 15/04 |
| 9,902,259 | B2* | 2/2018 | Kito | B60K 15/04 |
| 10,308,109 | B2* | 6/2019 | Hatanaka | B60K 15/035 |
| 10,479,195 | B2* | 11/2019 | Sekihara | B60K 15/035 |
| 10,493,841 | B2* | 12/2019 | Kito | B67D 7/42 |
| 2009/0127805 | A1 | 5/2009 | Benjey | |
| 2015/0239340 | A1 | 8/2015 | Kito et al. | |

FOREIGN PATENT DOCUMENTS

| | | |
|---|---|---|
| CN | 104859430 A | 8/2015 |
| DE | 11 2008 003 040 T5 | 10/2010 |
| JP | 2000-85381 A | 3/2000 |
| JP | 2005-199757 A | 7/2005 |
| JP | 2009-220590 A | 10/2009 |
| JP | 2011-511906 A | 4/2011 |
| JP | 2013-23168 A | 2/2013 |
| JP | 2015-157494 A | 9/2015 |
| KR | 10-2010-0089849 A | 8/2010 |
| WO | 2009/066156 A2 | 5/2009 |

OTHER PUBLICATIONS

Written Opinion dated Jul. 23, 2019 from corresponding International Patent Application No. PCT/JP2019/016559, 7 pages.

* cited by examiner

FUEL FILLER PIPE

CROSS-REFERENCE TO RELATED APPLICATIONS

This application is a continuation of International Application No. PCT/JP2019/016559 filed on Apr. 18, 2019, which claims priority from Japanese Patent Application No. 2018-121791 filed on Jun. 27, 2018, Japanese Patent Application No. 2018-121811 filed on Jun. 27, 2018, and Japanese Patent Application No. 2018-121832 filed on Jun. 27, 2018, each of which is incorporated herein by reference in its entirety.

BACKGROUND OF THE DISCLOSURE

1. Field of the Disclosure

The present disclosure relates to a fuel filler pipe serving as, for example, a passage through which fuel, such as gasoline, is fed into a fuel tank of a vehicle.

1. Description of the Related Art

Generally, for the purpose of reducing weight and cost of a vehicle, the efforts to form whole or part of a fuel filler pipe from a resin material have been made. For example, Japanese Laid-Open Patent Publication No. 2000-85381 discloses a fuel filler pipe including a tubular fuel filler pipe body formed from a resin material and connected to a fuel tank at one end thereof, the fuel filler pipe body including at another end thereof an opening to which a tubular nozzle guide for guiding a nozzle of a fuel filler gun into the fuel filler pipe body is mounted in a force fit manner.

SUMMARY

In this regard, when the fuel filler pipe body as described in JP2000-85381 is produced by using blow molding, the produced fuel filler pipe body has an inner circumferential surface having larger surface roughness variations and thus, may proceed with later processes in a state where airtightness between the fuel filler pipe body and the nozzle guide is insufficiently achieved as the nozzle guide is mounted to the fuel filler pipe body.

The present disclosure is made in view of the foregoing and an object of the present disclosure is to provide a fuel filler pipe having higher levels of airtightness even when its body part is formed from a resin body produced by using blow molding.

To achieve the object, the present disclosure is characterized by mounting a nozzle guide to the fuel filler pipe body such that the nozzle guide covers a portion of an outer circumferential surface of the fuel filler pipe body.

Specifically, the present disclosure is directed to a fuel filler pipe including a tubular fuel filler pipe body formed from a resin and adapted to connect to a fuel tank at one end thereof; and a tubular nozzle guide mounted on an one end side thereof to an opening of another end of the fuel filler pipe body and having at another end thereof an opening to which a filler cap is removably attached, the nozzle guide configured to guide a nozzle of a fuel filler gun into the fuel filler pipe body in the state where the filler cap is removed. The following solutions are then applied.

According to a first aspect, the fuel filler pipe body is a blow molded body, the fuel filler pipe body includes in an outer circumferential surface of an other end side thereof an annular recessed groove extending annularly about a tube center line, the nozzle guide includes on the one end side thereof an annular covering portion configured to cover annularly the outer circumferential surface of the other end side of the fuel filler pipe body, and an annular sealing member formed from rubber and configured to seal between an inner circumferential surface of the annular recessed groove and an inner circumferential surface of the annular covering portion fits with the annular recessed groove.

According to a second aspect which is an embodiment of the first aspect, the fuel filler pipe body includes in a middle part thereof along a thickness direction a resin barrier layer having fuel permeation resistance and formed continuously from a peripheral edge of an opening of the one end to a peripheral edge of the opening of the other end thereof, and the nozzle guide is a metal formed body, and the sealing member is a rubber body having fuel permeation resistance.

According to a third aspect which is an embodiment of the first or second aspect, the nozzle guide includes a first cylinder body including adjacent to an opening of one end thereof the annular covering portion; and a second cylinder body disposed inside an one end side of the first cylinder body and inside the other end side of the fuel filler pipe body, the second cylinder body having a peripheral edge of an opening of one end thereof spaced from a peripheral edge of the opening of the one end of the first cylinder body and having a peripheral edge of an opening of another end thereof connected to an inner circumferential surface of a midsection of the first cylinder body.

According to a fourth aspect which is an embodiment of any of the first to third aspects, the nozzle guide is a metal formed body, the fuel filler pipe body includes in the outer circumferential surface of the other end side thereof a protuberance portion projecting laterally outwardly, the nozzle guide includes a regulating portion configured to regulate a movement of the fuel filler pipe body toward the opening of the other end of the nozzle guide in the state where the opening of the other end of the fuel filler pipe body is inserted into the nozzle guide from the one end side of the nozzle guide; an annular covering portion formed on the one end side of the nozzle guide and configured to cover annularly the outer circumferential surface of the other end opening side of the fuel filler pipe body that is regulated by the regulating portion; and an engagement portion formed in the annular covering portion and configured to engage with a part of the protuberance portion away from the peripheral edge of the opening of the other end of the fuel filler pipe body.

According to a fifth aspect which is an embodiment of the fourth aspect, the annular covering portion includes a notched recess being open in a peripheral edge of an opening of the annular covering portion, and the fuel filler pipe body includes in the outer circumferential surface of the other end side thereof a fitting protrusion configured to fit with the notched recess in the state where the annular covering portion covers the outer circumferential surface of the other end opening side of the fuel filler pipe body.

According to a sixth aspect which is an embodiment of the fourth or fifth aspect, the regulating portion is provided continuous with the annular covering portion and includes an annular portion having a gentle decrease in diameter as extending away from the annular covering portion, and the engagement portion includes a projection part formed from a part left by making an U-shaped cutout in the annular covering portion, the projection part jutting out inwardly of the cutout part, and the engagement portion is formed to bend the projection part inwardly of the annular covering portion in the state where the other end of the fuel filler pipe body is inserted into the annular covering portion to be regulated by the regulating portion.

According to a seventh aspect which is an embodiment of any of the first to sixth aspects, a tubular breather tube formed from a resin is arranged in parallel with and lateral to the fuel filler pipe body, the breather tube adapted to connect at one end thereof to the fuel tank and at another end thereof to the other end opening side of the fuel filler pipe body, and the breather tube including a conductive resin tube layer being conductive and forming an outer circumferential surface of the breather tube, the fuel filler pipe body includes a resin body inner layer being conductive and forming an inner circumferential surface of the fuel filler pipe body and a resin body outer layer being non-conductive and forming an outer circumferential surface of the fuel filler pipe body, and the fuel filler pipe body is adapted to be secured to a vehicle body by using a metal mounting adapted to contact at least to the outer circumferential surface of the breather tube, and the fuel filler pipe body includes on the other end opening side thereof a mounting hole into which an other end side of the breather tube is force-fitted.

According to an eighth aspect which is an embodiment of the seventh aspect, the fuel filler pipe body includes on the other end opening side thereof a projecting cylinder portion projecting laterally outwardly and including the mounting hole extending through in a projection direction, and the projecting cylinder portion includes a resin cylinder inner layer being conductive, forming an inner circumferential surface of the projecting cylinder portion, and being continuous with the resin body inner layer.

According to a ninth aspect which is an embodiment of the seventh or eighth aspect, the nozzle guide includes on the one end side thereof a cylindrical nozzle insertion part located inside the other end opening side of the fuel filler pipe body, and the nozzle insertion part includes a ground portion extending laterally outwardly and including an extension end adapted to contact to the inner circumferential surface of the fuel filler pipe body.

According to the first aspect of the present disclosure, even in use of the fuel filler pipe body produced by using blow molding and thus including the inner circumferential surface having larger surface roughness variations, the fuel filler pipe has higher levels of airtightness since the fuel filler pipe body and the nozzle guide are assembled to fill a gap between the inner circumferential surface of the nozzle guide and the outer circumferential surface of the fuel filler pipe body having smaller surface roughness variations, by using the sealing member formed from rubber relatively softer than a resin material.

According to the second aspect of the present disclosure, the barrier layer preventing fuel permeation is provided in the middle layer of the fuel filler pipe body from the peripheral edge of the opening of the one end of the fuel filler pipe body to the peripheral edge of the opening of the other end, so that when the sealing member is arranged between the inner circumferential surface of the nozzle guide and the outer circumferential surface of the fuel filler pipe body, fuel located inside the fuel filler pipe body is less likely to reach the sealing member due to part of the fuel moving around the peripheral edge of the opening of the other end of the fuel filler pipe body, as compared with the case where the sealing member is arranged between the outer circumferential surface of the nozzle guide and the inner circumferential surface of the fuel filler pipe body. Thus, an amount of the fuel permeating through to the exterior of the fuel filler pipe via a layer of the fuel filler pipe body placed between the barrier layer and the sealing member can be significantly reduced.

According to the third aspect of the present disclosure, the second cylinder body is located inside the other end side of the fuel filler pipe body and the second cylinder body has the peripheral edge of the opening of the other end thereof connected to the inner circumferential surface of the mid-section of the first cylinder body, so that when the nozzle of the fuel filler gun is inserted in the nozzle guide, the nozzle is smoothly guided into the fuel filler pipe body without contacting the peripheral edge of the opening of the other end of the fuel filler pipe body due to the second cylinder body. Thus, the fuel filler pipe facilitates fuel feeding operations while having improved airtightness between the nozzle guide and the fuel filler pipe body.

According to the fourth aspect of the present disclosure, when the nozzle guide is mounted to the fuel filler pipe body, the nozzle guide can be prevented from being removed from the fuel filler pipe body without force-fit operations as described in JP2000-85381, allowing easier assembling operations of the fuel filler pipe. As the nozzle guide then moves towards the one end of the fuel filler pipe body, the annular regulating portion of the nozzle guide contacts the peripheral edge of the opening of the other end of the fuel filler pipe body. On the other hand, as the nozzle guide moves in a direction of the removal from the fuel filler pipe body, the engagement portion of the nozzle guide contacts the protuberance portion of the fuel filler pipe body. A position of the nozzle guide with respect to the fuel filler pipe body along a direction of the tube center line is thus precisely determined, allowing the nozzle guide to be mounted at a precise position with respect to the fuel filler pipe body. Moreover, even when the fuel filler pipe body is the resin body and the nozzle guide is the metal formed body, the nozzle guide can be mounted to the fuel filler pipe body without force-fitting the nozzle guide into the fuel filler pipe body by applying the structure of the present disclosure.

According to the fifth aspect of the present disclosure, even if force is unexpectedly exerted to the nozzle guide in a circumferential direction of the fuel filler pipe body, the nozzle guide is assuredly prevented from rotating with respect to the fuel filler pipe body about the tube center line since the fitting protrusion is caught by the notched recess.

According to the sixth aspect of the present disclosure, when the nozzle guide is mounted to the fuel filler pipe body, the fuel filler pipe body is easily inserted into the nozzle guide by inserting the other end of the fuel filler pipe body into the opening of the one end of the nozzle guide before bending the projection inwardly of the annular covering portion. Once the fuel filler pipe body is inserted into the nozzle guide, the peripheral edge of the opening of the other end of the fuel filler pipe body contacts the regulating portion of the nozzle guide, thus allowing an insertion position of the fuel filler pipe body to be precisely determined with respect to the nozzle guide. The projection is then bent inwardly of the annular covering portion in the state where the insertion position of the fuel filler pipe body is determined with respect to the nozzle guide, and thereby, the nozzle guide cannot be removed from the fuel filler pipe body. Thus, the nozzle guide can be easily mounted at a precise position with respect to the fuel filler pipe body.

According to the seventh aspect of the present disclosure, when the other end of the breather tube is force-fitted into the mounting hole, the conductive resin tube layer forming the outer circumferential surface of the breather tube contacts the resin body inner layer of the fuel filler pipe body facing a peripheral edge of an opening of the mounting hole.

Thus, the inner circumferential surface of the fuel filler pipe body is grounded with the vehicle body via the resin body inner layer, the conductive resin tube layer, and the mounting, thus enabling prevention of ignition by electrostatic charge. The conductive resin layer relatively costly in production of the fuel filler pipe body is then only provided in the inner part of the fuel filler pipe body, enabling lower cost of the fuel filler pipe being completed. Further, the fuel filler pipe body and the breather tube are formed from a resin material, allowing the whole fuel filler pipe to be lightweight.

According to the eighth aspect of the present disclosure, when the other end of the breather tube is force-fitted into the mounting hole, an area of the conductive part of the fuel filler pipe body contacting the outer circumferential surface of the breather tube is larger due to the resin cylinder inner layer, as compared with the case of only the resin body inner layer of the fuel filler pipe body. Thus, even if the fuel filler pipe body is electrostatically charged, static electricity can be assuredly discharged into the vehicle body.

According to the ninth aspect of the present disclosure, when a fuel feed operator touches the filler cap, static electricity is discharged from the nozzle guide into the vehicle body via the ground portion led to the fuel filler pipe body even if the fuel feed operator has the static electricity, thus enabling reliable prevention of ignition by electrostatic charge.

DETAILED DESCRIPTION

Embodiments of the present disclosure are described in detail below with reference to the drawings. It is noted that following description of preferred embodiments is merely an example in nature.

Figure 1:
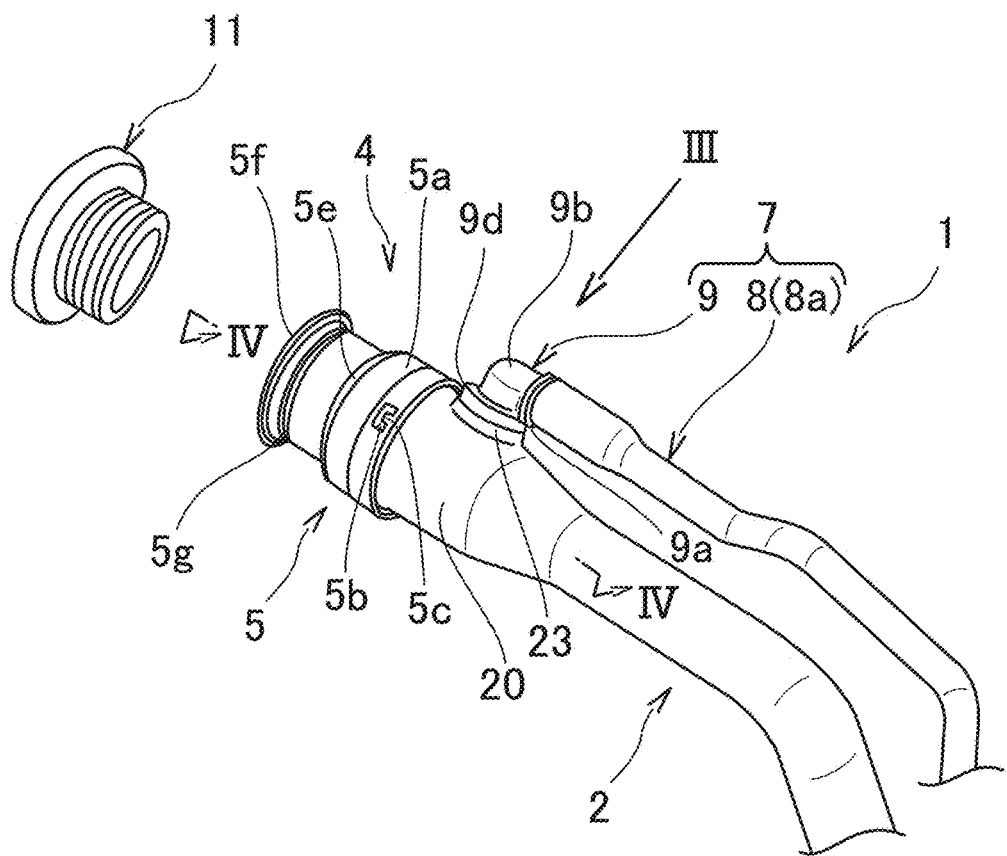
FIG. 1 is a perspective view illustrating a fuel filler pipe according to an embodiment of the present disclosure, a fuel tank connected to the fuel filler pipe, and a filler cap adapted to be attached to the fuel filler pipe.
Figure 1:
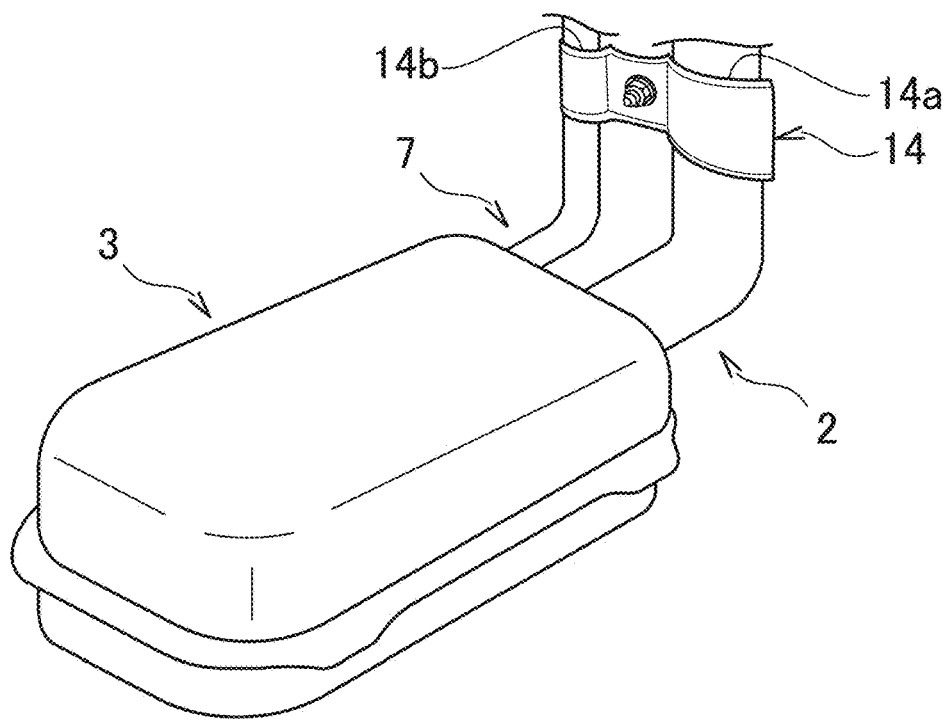

FIG. 1 illustrates a fuel filler pipe 1 for a vehicle according to an embodiment of the present disclosure. The fuel filler pipe 1 is used as a passage of fuel when the fuel is fed to a fuel tank 3 of a vehicle. The fuel filler pipe 1 includes a tubular fuel filler pipe body 2 formed from a resin and adapted to connect to the fuel tank 3 at one end thereof.

Figure 5:
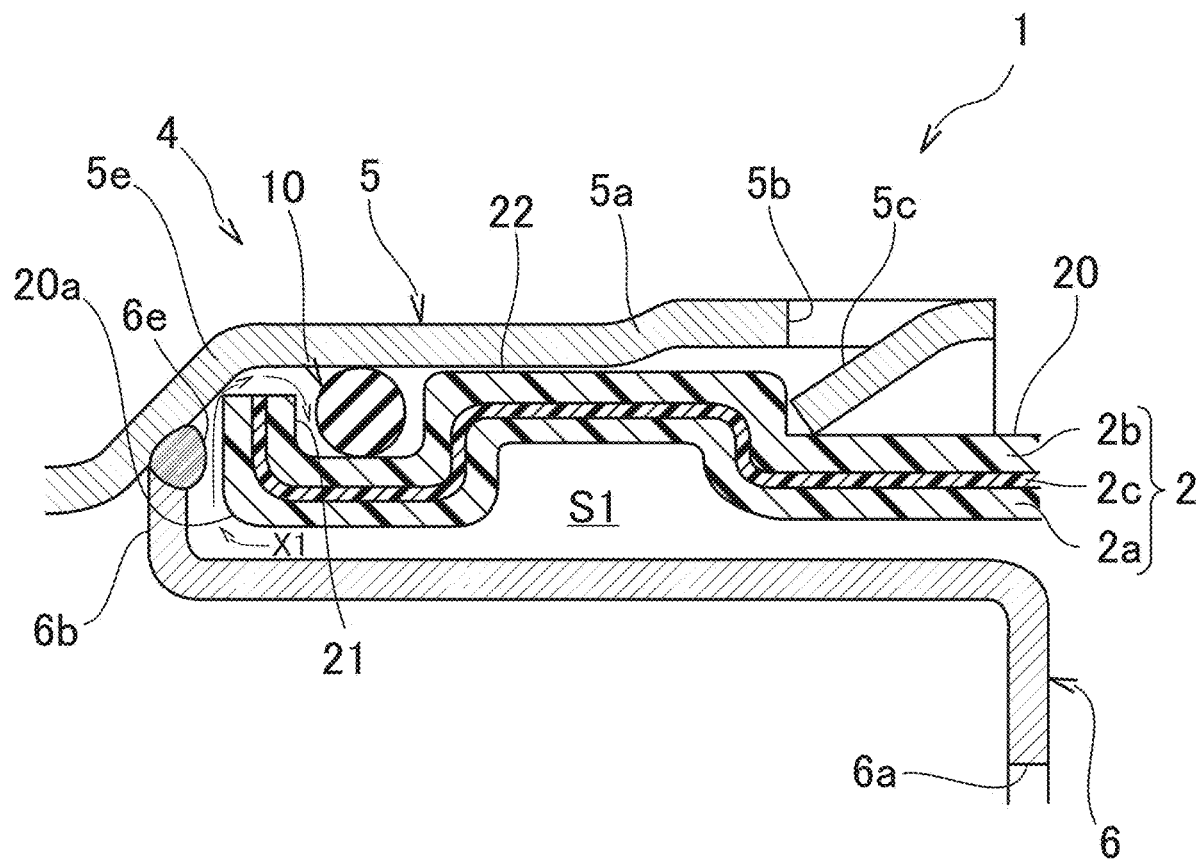
FIG. 5 is an enlarged view of part V of FIG. 4.
Figure 6:
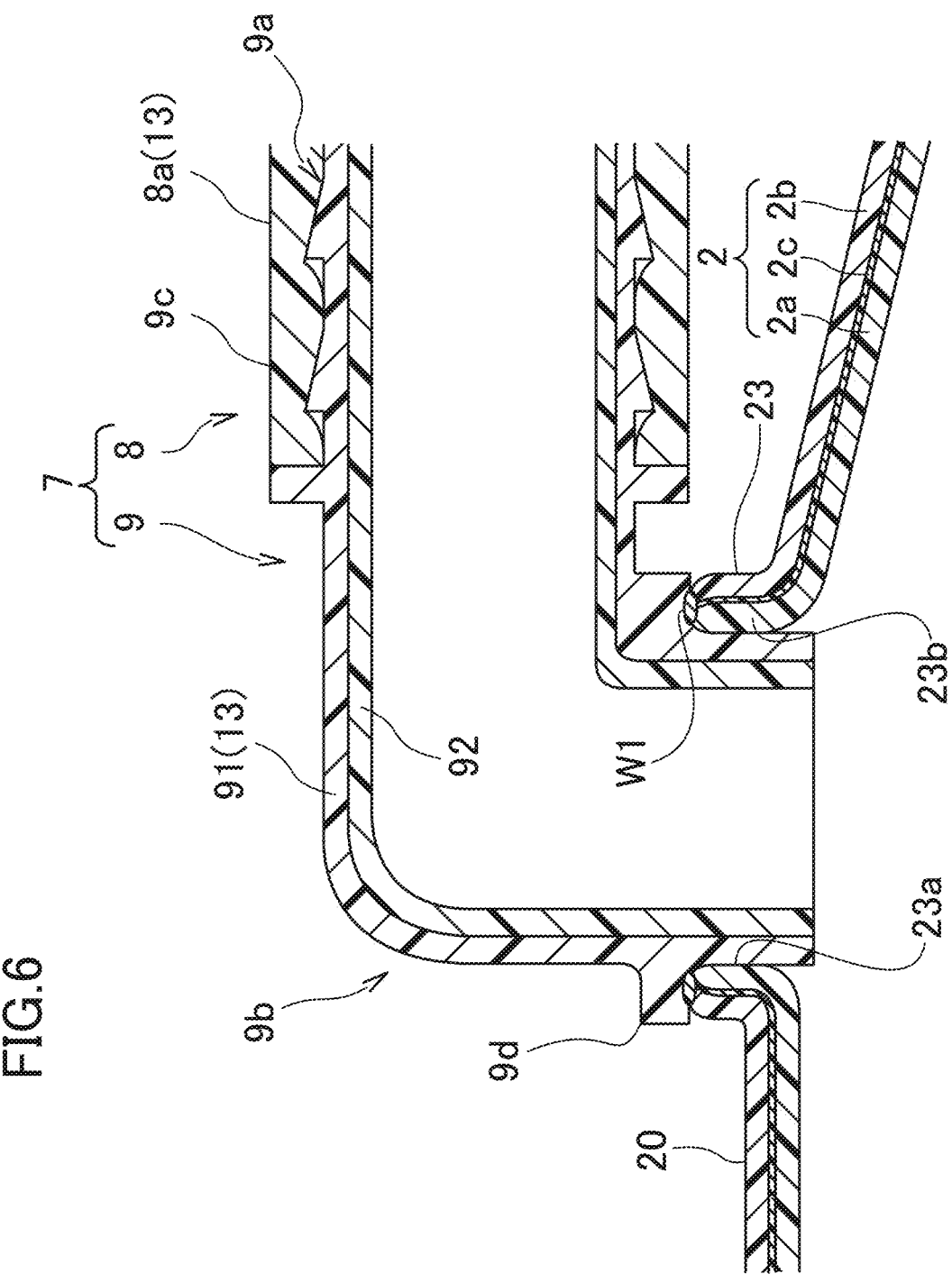
FIG. 6 is an enlarged view of part VI of FIG. 4.

The fuel filler pipe body 2 is a blow molded body produced by using blow molding. As illustrated in FIGS. 5 and 6, a resin barrier layer 2c formed from ethylene-vinylalcohol copolymer (EVOH) and having fuel permeation resistance is formed in a middle part of the fuel filler pipe body 2 along a thickness direction continuously from a peripheral edge of an opening of the one end of the fuel filler pipe body 2 to a peripheral edge of an opening of another end. For reasons of convenience, FIG. 4 does not illustrate the resin barrier layer 2c.

A resin body inner layer 2a formed from high density polyethylene is laminated on an inner part of the resin barrier layer 2c via an adhesive resin layer (not shown). The resin body inner layer 2a is conductive and has low temperature impact resistance.

A resin body outer layer 2b formed from high density polyethylene is laminated on an outer part of the resin barrier layer 2c via an adhesive resin layer (not shown). The resin body outer layer 2b is non-conductive and has low temperature impact resistance.

Figure 4:
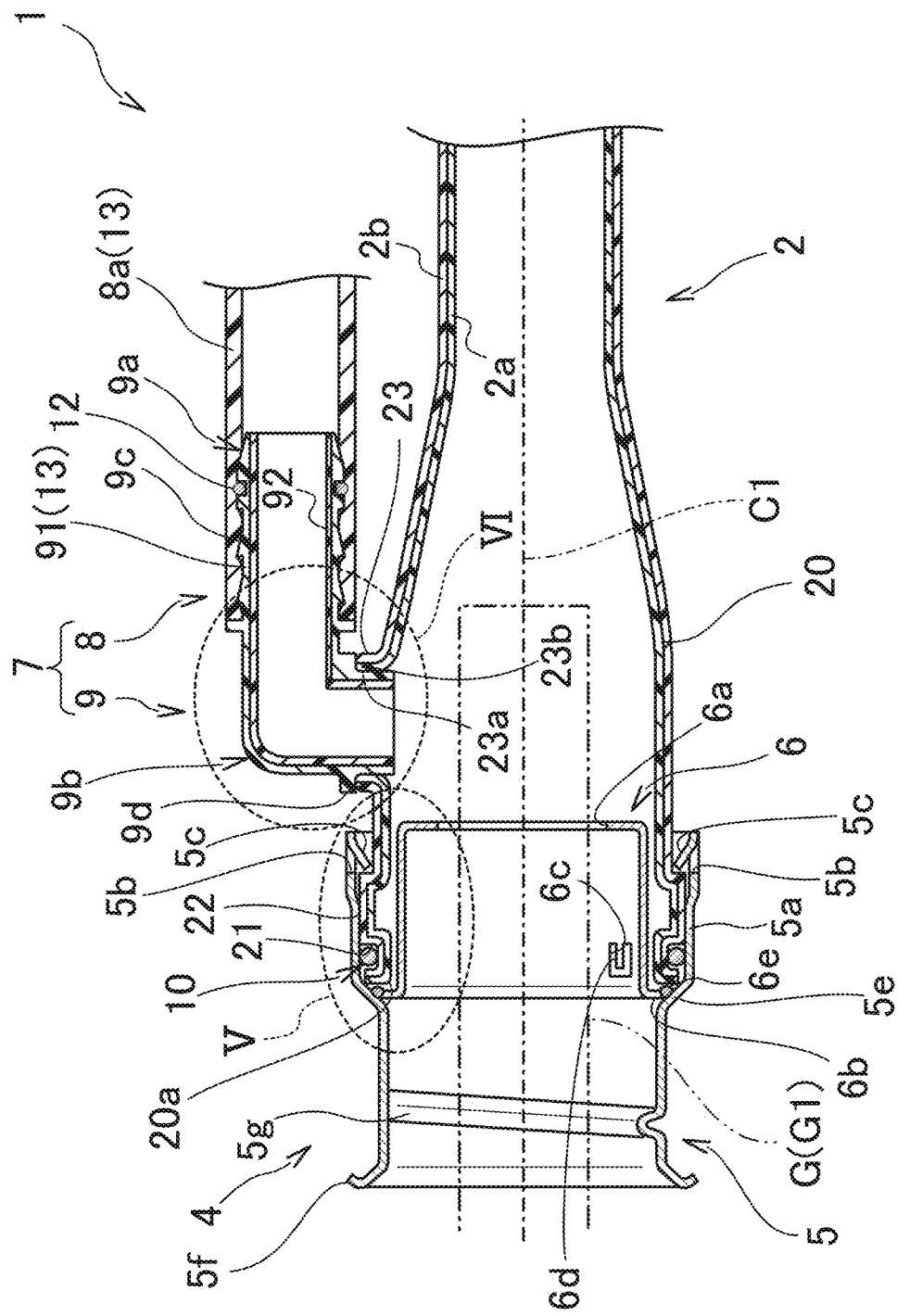
FIG. 4 is a cross-sectional view taken along plane IV-IV in FIG. 1.

As illustrated in FIG. 4, on an other end side of the fuel filler pipe body 2, an expanded pipe portion 20 having a larger diameter than a portion from the one end of the fuel filler pipe body 2 to a midsection is formed. The opening of the other end of the fuel filler pipe body 2 is hereinafter referred to as an expanded pipe opening 20a.

An annular recessed groove 21 extending annularly about a tube center line C1 is formed in an outer circumferential surface of the expanded pipe portion 20 adjacent to the expanded pipe opening 20a.

An annular protuberance portion 22 projecting laterally outwardly is formed in a part of the expanded pipe portion 20 continuous with a portion of the annular recessed groove 21 away from the expanded pipe opening 20a.

A projecting cylinder portion 23 projecting laterally outwardly to form a general disk shape is formed in a part of the expanded pipe portion 20 away from the expanded pipe opening 20a more than the annular protuberance portion 22. As illustrated in FIGS. 4 and 6, a mounting hole 23a extending through in a projection direction to make an interior and an exterior of the fuel filler pipe body 2 in communication is formed in the projecting cylinder portion 23.

The projecting cylinder portion 23 includes a resin cylinder inner layer 23b forming an inner surface of the projecting cylinder portion 23 and being conductive. The resin cylinder inner layer 23b is continuous with the resin body inner layer 2a.

Figure 3:
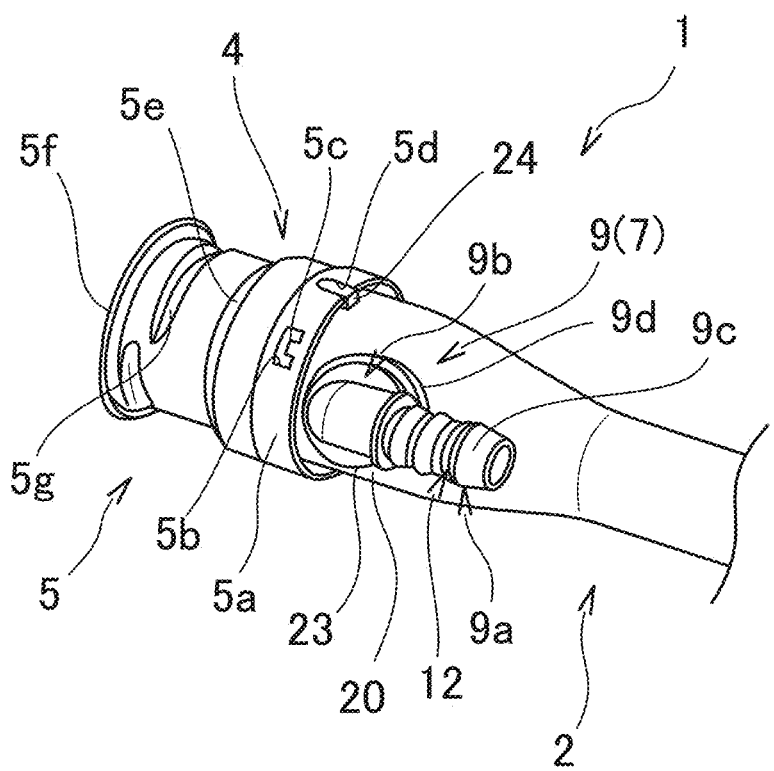
FIG. 3 is a fragmentary view taken in the direction of arrow III in FIG. 1.

As illustrated in FIG. 3, a fitting protrusion 24 being generally rectangular prism shaped protrudes on the outer circumferential surface of the expanded pipe portion 20 adjacent to the projecting cylinder portion 23.

As illustrated in FIG. 1, the fuel filler pipe 1 then includes a short, generally tubular nozzle guide 4. The nozzle guide 4 is mounted on one end side thereof to the expanded pipe opening 20a of the fuel filler pipe body 2.

The nozzle guide 4 includes at another end thereof an opening to which a filler cap 11 is removably attached. As illustrated in FIG. 4, the nozzle guide 4 is configured to guide a nozzle G1 of a fuel filler gun G into the fuel filler pipe body 2 in the state where the filler cap 11 is removed.

As illustrated in FIGS. 2 to 5, the nozzle guide 4 is a metal formed body obtained by press-forming an iron plate. The nozzle guide 4 includes a first cylinder body 5 forming an outer circumferential surface of the nozzle guide 4 and a second cylinder body 6 (nozzle insertion part) disposed inside the first cylinder body 5 on an one end side of the first cylinder body 5. The first and second cylinder bodies 5, 6 have a tube center line aligned with the tube center line C1.

At a midsection of the first cylinder body 5, an annular regulating portion 5e having a gentle decrease in diameter from the one end side of the first cylinder body 5 toward another end side is formed. The annular regulating portion 5e allows half of the first cylinder body 5 on the one end side to have a larger outer diameter than half on the other end side.

The annular regulating portion 5e is configured to regulate a movement of the fuel filler pipe body 2 toward an opening of the other end side of the first cylinder body 5 (nozzle guide 4) in the state where the opening of the other end side of the fuel filler pipe body 2 is inserted into the first cylinder body 5 from the one end side of the first cylinder body 5.

An annular covering portion 5a is provided generally in the half of the first cylinder body 5 on the one end side to be continuous with the annular regulating portion 5e. The annular covering portion 5a is configured to cover annularly the outer circumferential surface of the other end opening side of the fuel filler pipe body 2 (expanded pipe portion 20), which is inserted into the first cylinder body 5 to be regulated by the annular regulating portion 5e.

A plurality of first cut-out portions 5b each cut out into a general U-shape in side view are formed around the tube center line C1 in a part of the annular covering portion 5a adjacent to a peripheral edge of an opening of the annular covering portion 5a.

As illustrated in FIG. 5, a projection 5c (engagement portion) diagonally projecting away from the peripheral edge of the opening of the annular covering portion 5a and inwardly of the annular covering portion 5a is provided in each of the first cut-out portions 5b.

The projection 5c is a portion formed from a part left by making a U-shaped cutout in the annular covering portion 5a, the portion jutting out inwardly of the cut-out part. The projection 5c is formed by bending inwardly of the annular covering portion 5a in the state where the other end of the fuel filler pipe body 2 is inserted into the annular covering portion 5a to be regulated by the annular regulating portion 5e.

The projections 5c are each configured to engage with a part of the annular protuberance portion 22 away from the expanded pipe opening 20a, in the state where the other end side of the fuel filler pipe body 2 is located inside the first cylinder body 5. The projections 5c then prevent the nozzle guide 4 from being removed from the fuel filler pipe body 2.

As illustrated in FIG. 3, a notched recess 5d opening in the peripheral edge of the opening of the annular covering portion 5a is formed in the annular covering portion 5a.

When the other end of the fuel filler pipe body 2 is inserted into the annular covering portion 5a with the fitting protrusion 24 of the fuel filler pipe body 2 corresponding to the notched recess 5d, the fitting protrusion 24 fits with the notched recess 5d such that the annular covering portion 5a covers the outer circumferential surface of the other end opening side of the fuel filler pipe body 2.

An annular bent portion 5f bent radially outwardly is formed in a peripheral edge portion of the other end opening of the first cylinder body 5. One female thread 5g is formed in a part of the first cylinder body 5 adjacent to the bent portion 5f on the other end side of the first cylinder body 5.

As illustrated in FIG. 4, a nozzle insertion port 6a corresponding to an outer diameter of the nozzle G1 of the fuel filler gun G is formed at one end of the second cylinder body 6. The nozzle insertion port 6a is configured to guide into the fuel filler pipe body 2 the nozzle G1 inserted in the nozzle guide 4.

A flange 6b extending laterally outwardly is then formed on a peripheral edge of another end opening of the second cylinder body 6.

As illustrated in FIG. 5, the second cylinder body 6 is mounted to the first cylinder body 5 by forming an annular welded portion 6e between an outer peripheral edge portion of the flange 6b and an inner circumferential surface of the annular regulating portion 5e of the first cylinder body 5 by means of laser welding. An annular space S1 extending around the tube center line C1 and in which the other end side of the fuel filler pipe body 2 is located is formed between the second cylinder body 6 and the annular covering portion 5a.

The second cylinder body 6 is thus disposed inside the other end side of the fuel filler pipe body 2. The second cylinder body 6 then includes a peripheral edge of an opening of the one end thereof spaced from a peripheral edge of an opening of the one end of the first cylinder body 5 and the peripheral edge of the opening of the other end thereof connected to an inner circumferential surface of the midsection of the first cylinder body 5.

As illustrated in FIG. 4, a second cut-out portion 6c cut out into a general U-shape in side view is formed in a part of the second cylinder body 6 adjacent to the flange 6b.

A ground portion 6d diagonally extending to be closer to the flange 6d and to advance toward the other end of the fuel filler pipe body 2 is provided in the second cut-out portion 6c.

The ground portion 6d has a distal end in contact with an inner circumferential surface of the other end side of the fuel filler pipe body 2, so that when a fuel feed operator touches the filler cap 11, static electricity charged in the fuel feed operator is discharged into the fuel filler pipe body 2.

An annular sealing member 10 fits with the annular recessed groove 21 of the fuel filler pipe body 2. The sealing member 10 is a rubber body formed from fluororubber and having fuel permeation resistance. As illustrated in FIG. 5, the sealing member 10 seals between an inner circumferential surface of the annular recessed groove 21 and an inner circumferential surface of the annular covering portion 5a.

As illustrated in FIG. 1, a breather tube 7 adapted to connect at one end thereof to the fuel tank 3 and at another end thereof to the expanded pipe portion 20 of the fuel filler pipe body 2 is arranged in parallel with and lateral to the fuel filler pipe body 2. The breather tube 7 is configured to release air containing vaporized fuel from the fuel tank 3 toward a nozzle guide 4 side of the fuel filler pipe body 2, when the fuel is fed to the fuel tank 3 by using the fuel filler pipe body 2.

The breather tube 7 includes a tube body 8 formed from a resin, being elongated and tubular, and adapted to connect at one end thereof to the fuel tank 3; and a joint member 9 formed from a resin, adapted to connect to another end side of the tube body 8, and adapted to connect the tube body 8 to the fuel filler pipe body 2.

As illustrated in FIG. 6, the tube body 8 is formed by using single color molding and from a tube body layer 8a being conductive.

The joint member 9 is formed by using double color molding. The joint member 9 includes a joint outer layer 91 being conductive and forming an outer circumferential surface of the joint member 9, and a joint inner layer 92 being non-conductive and forming an inner circumferential surface of the joint member 9.

Figure 2:
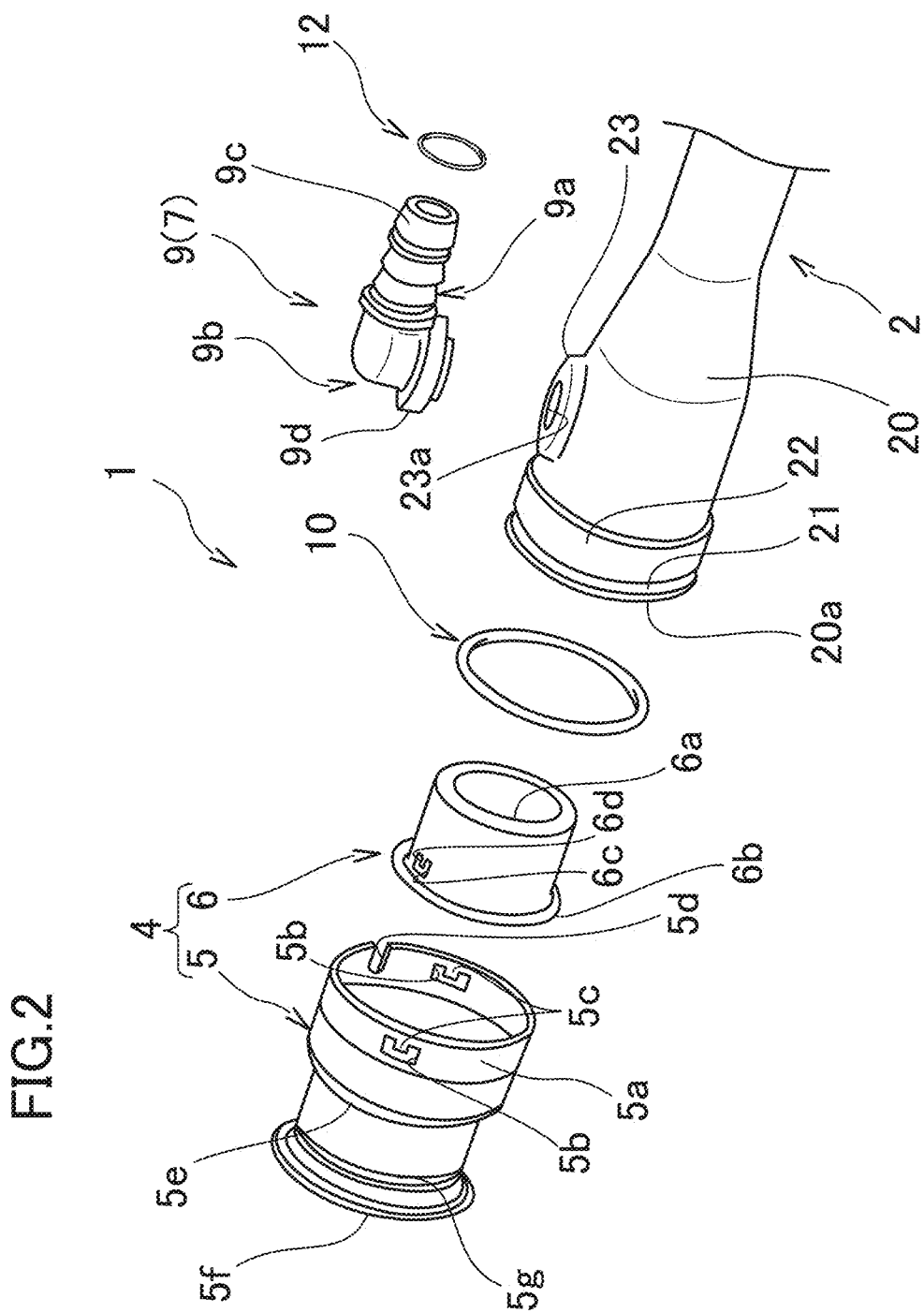
FIG. 2 is an exploded perspective view of a nozzle guide side of a fuel filler pipe according to an embodiment of the present disclosure.

As illustrated in FIGS. 2 to 4, the joint member 9 is generally L-shaped in side view. The joint member 9 includes a first joint portion 9a extending along the fuel filler pipe body 2 and a second joint portion 9b extending from the first joint portion 9a toward the fuel filler pipe body 2.

The first joint portion 9a includes a conical connecting surface portion 9c including a plurality of ridge portions extending annularly and arranged side by side. The tube body 8 and the joint member 9 are coupled in an airtight manner by externally fitting an O-ring 12 over the connecting surface portion 9c, and force-fitting the first joint portion 9a into the other end side of the tube body 8.

When the tube body 8 and the joint member 9 are then connected, the tube body layer 8a and the joint outer layer 91 are continuous.

The tube body layer 8a and the joint outer layer 91 then constitute a conductive resin tube layer 13 of the present disclosure. The conductive resin tube layer 13 forms an outer circumferential surface of the breather tube 7.

The second joint portion 9b includes at a midsection thereof an annular rib 9d projecting laterally outwardly. The joint member 9 and the fuel filler pipe body 2 are connected by force-fitting the second joint portion 9b into the mounting hole 23a of the fuel filler pipe body 2 and connecting between the annular rib 9d and the projecting cylinder portion 23 by means of a welding portion W1, thus allowing the conductive resin tube layer 13 and the resin cylinder inner layer 23b to be continuous.

As illustrated in FIG. 1, the fuel filler pipe body 2 and the breather tube 7 are secured to a vehicle body (not shown) by means of a mounting bracket 14 (mounting) which is obtained by press-forming a metal plate and generally belt-shaped.

The mounting bracket 14 includes a first curved surface portion 14a corresponding to the outer circumferential surface of the fuel filler pipe body 2 and a second curved surface portion 14b corresponding to the outer circumferential surface of the breather tube 7. The first curved surface portion 14a and the second curved surface portion 14b allow the mounting bracket 14 to contact in a larger area to the fuel filler pipe body 2 and the breather tube 7.

According to the embodiment of the present disclosure, even in use of the fuel filler pipe body 2 produced by using blow molding and thus including the inner circumferential surface having larger surface roughness variations, the fuel filler pipe 1 has higher levels of airtightness since the fuel filler pipe body 2 and the nozzle guide 4 are assembled to fill a gap between the inner circumferential surface of the nozzle guide 4 and the outer circumferential surface of the fuel filler pipe body 2 having smaller surface roughness variations, by using the sealing member 10 formed from rubber relatively softer than a resin material.

The resin barrier layer 2c preventing fuel permeation is provided in the middle layer of the fuel filler pipe body 2 from the peripheral edge of the opening of the one end of the fuel filler pipe body 2 to the peripheral edge of the opening of the other end, so that when the sealing member 10 is arranged between the inner circumferential surface of the nozzle guide 4 and the outer circumferential surface of the fuel filler pipe body 2, fuel located inside the fuel filler pipe body 2 is less likely to reach the sealing member 10 due to part of the fuel moving around the peripheral edge of the opening of the other end of the fuel filler pipe body 2, as compared with the case where the sealing member 10 is arranged between the outer circumferential surface of the nozzle guide 4 and the inner circumferential surface of the fuel filler pipe body 2 (see arrow X1 in FIG. 5 indicating a pathway of movement of the fuel). Thus, an amount of the fuel permeating through to the exterior of the fuel filler pipe 1 via a layer of the fuel filler pipe body 2 placed between the resin barrier layer 2c and the sealing member 10 can be significantly reduced.

The second cylinder body 6 is located inside the other end side of the fuel filler pipe body 2 and the second cylinder body 6 includes the peripheral edge of the opening of the other end thereof connected to the inner circumferential surface of the midsection of the first cylinder body 5, so that when the nozzle G1 of the fuel filler gun G is inserted in the nozzle guide 4, the nozzle G1 is smoothly guided into the fuel filler pipe body 2 without contacting the peripheral edge of the opening of the other end of the fuel filler pipe body 2 due to the second cylinder body 6. Thus, the fuel filler pipe 1 facilitates fuel feeding operations while having improved airtightness between the nozzle guide 4 and the fuel filler pipe body 2.

When the nozzle guide 4 is mounted to the fuel filler pipe body 2, the nozzle guide 4 can be prevented from being removed from the fuel filler pipe body 2 without force-fit operations as described in JP2000-85381, allowing easier assembling operations of the fuel filler pipe 1.

As the nozzle guide 4 then moves towards the one end of the fuel filler pipe body 2, the annular regulating portion 5e of the nozzle guide 4 contacts the peripheral edge of the opening of the other end of the fuel filler pipe body 2. On the other hand, as the nozzle guide 4 moves in a direction of the removal from the fuel filler pipe body 2, the projection 5c of the nozzle guide 4 contacts the annular protuberance portion 22 of the fuel filler pipe body 2. A position of the nozzle guide 4 with respect to the fuel filler pipe body 2 along a direction of the tube center line C1 is thus precisely determined, allowing the nozzle guide 4 to be mounted at a precise position with respect to the fuel filler pipe body 2.

Moreover, even when the fuel filler pipe body 2 is the resin body and the nozzle guide 4 is the metal formed body, the nozzle guide 4 can be mounted to the fuel filler pipe body 2 without force-fitting the nozzle guide 4 into the fuel filler pipe body 2 by applying the structure of the present disclosure.

Even if force is unexpectedly exerted to the nozzle guide 4 in a circumferential direction of the fuel filler pipe body 2, the nozzle guide 4 is assuredly prevented from rotating with respect to the fuel filler pipe body 2 about the tube center line C1 since the fitting protrusion 24 is caught by the notched recess 5d.

Moreover, when the nozzle guide 4 is mounted to the fuel filler pipe body 2, the fuel filler pipe body 2 is easily inserted into the nozzle guide 4 by inserting the other end of the fuel filler pipe body 2 into the opening of the one end of the nozzle guide 4 before bending the projection 5c inwardly of the annular covering portion 5a. Once the fuel filler pipe body 2 is inserted into the nozzle guide 4, the peripheral edge of the opening of the other end of the fuel filler pipe body 2 contacts the annular regulating portion 5e of the nozzle guide 4, thus allowing an insertion position of the fuel filler pipe body 2 to be precisely determined with respect to the nozzle guide 4. The projection 5c is then bent inwardly of the annular covering portion 5a in the state where the insertion position of the fuel filler pipe body 2 is determined with respect to the nozzle guide 4, and thereby, the nozzle guide 4 cannot be removed from the fuel filler pipe body 2. Thus, the nozzle guide 4 can be easily mounted at a precise position with respect to the fuel filler pipe body 2.

When the other end of the breather tube 7 is force-fitted into the mounting hole 23a, the conductive resin tube layer 13 forming the outer circumferential surface of the breather tube 7 contacts the resin body inner layer 2a of the fuel filler pipe body 2 facing a peripheral edge of an opening of the mounting hole 23a. Thus, the inner circumferential surface of the fuel filler pipe body 2 is grounded with the vehicle body via the resin body inner layer 2a, the conductive resin tube layer 13, and the mounting bracket 14, enabling prevention of ignition by electrostatic charge.

The conductive resin layer relatively costly in production of the fuel filler pipe body 2 is only provided in the inner part of the fuel filler pipe body 2, enabling lower cost of the fuel filler pipe 1 being completed.

Further, the fuel filler pipe body 2 and the breather tube 7 are formed from a resin material, allowing the whole fuel filler pipe 1 to be lightweight.

When the other end of the breather tube 7 is force-fitted into the mounting hole 23a, an area of the conductive part of the fuel filler pipe body 2 contacting the outer circumferential surface of the breather tube 7 is larger due to the resin cylinder inner layer 23b, as compared with the case of only the resin body inner layer 2a of the fuel filler pipe body 2. Thus, even if the fuel filler pipe body 2 is electrostatically charged, static electricity can be assuredly discharged into the vehicle body.

When a fuel feed operator touches the filler cap 11, static electricity is discharged from the nozzle guide 4 into the vehicle body via the ground portion 6d led to the fuel filler pipe body 2 even if the fuel feed operator has the static electricity, thus enabling reliable prevention of ignition by electrostatic charge.

In the embodiment of the present disclosure, the nozzle guide 4 is the metal formed body formed from a metal plate; however, the nozzle guide 4 may be formed from a metal material, such as stainless steel material.

In the embodiment of the present disclosure, the joint member 9 of the breather tube 7 has the double layer structure produced by using two color molding; however, the embodiment is not limited to this configuration. For example, the joint member 9 may have a structure including three or more layers as long as an outermost layer is conductive, or may have a single layer structure being conductive.

In the embodiment of the present disclosure, the tube body 8 has the structure formed by using single color molding; however, the tube body 8 may have a structure including two or more layers as long as an outermost layer is conductive.

In the embodiment of the present disclosure, the nozzle guide 4 is formed from a metal material; however, the nozzle guide 4 may be formed from a resin material.

In the embodiment of the present disclosure, the annular regulating portion 5e defining the position of the fuel filler pipe body 2 with respect to nozzle guide 4 is annular; however, the annular regulating portion 5e is not necessarily annular, and may have any shape to which the peripheral edge of the opening of the other end of the fuel filler pipe body 2 can contact.

Further, in the embodiment of the present disclosure, the annular protuberance portion 22 of the fuel filler pipe body 2 is annular; however, the annular protuberance portion 22 is not necessarily annular, and may have any shape with which the projection 5c can engage.

The present disclosure is suitable for a fuel filler pipe serving as a passage through which fuel, such as gasoline, is fed into a fuel tank of a vehicle.

What is claimed is:

1. A fuel filler pipe comprising a tubular fuel filler pipe body formed from a resin and adapted to connect to a fuel tank at one end thereof; and a tubular nozzle guide mounted on a one end side thereof to an opening of another end of the fuel filler pipe body and having at another end thereof an opening to which a filler cap is removably attached, wherein the nozzle guide is configured to guide a nozzle of a fuel filler gun into the fuel filler pipe body in a state where the filler cap is removed;

wherein the nozzle guide is a metal formed body;

wherein the fuel filler pipe body is a blow molded body, and the fuel filler pipe body includes in an outer circumferential surface of an other end side thereof an annular recessed groove extending annularly about a tube center line, and a protuberance portion projecting laterally outwardly;

wherein the nozzle guide includes a regulating portion configured to regulate a movement of the fuel filler pipe body toward the opening of the other end of the nozzle guide in a state where the opening of the other end of the fuel filler pipe body is inserted into the nozzle guide from the one end side of the nozzle guide, an annular covering portion formed on the one end side of the nozzle guide and configured to cover annularly the outer circumferential surface of the other end side of the fuel filler pipe body that is regulated by the regulating portion, and an engagement portion formed in the annular covering portion and configured to engage with a part of the protuberance portion away from the peripheral edge of the opening of the other end of the fuel filler pipe body;

wherein an annular sealing member formed from rubber and configured to seal between an inner circumferential surface of the annular recessed groove and an inner circumferential surface of the annular covering portion fits with the annular recessed groove; and wherein the regulating portion is provided continuous with the annular covering portion and includes an annular portion having a gentle decrease in diameter as extending away from the annular covering portion; and wherein the engagement portion includes a projection part formed from a part left by making a U-shaped cutout in the annular covering portion, the projection part jutting out inwardly of the cutout part, and the engagement portion is formed to bend the projection part inwardly of the annular covering portion in the state where the other end of the fuel filler pipe body is inserted into the annular covering portion to be regulated by the regulating portion.

2. The fuel filler pipe according to claim 1, wherein the fuel filler pipe body includes in a middle part thereof along a thickness direction a resin barrier layer having fuel permeation resistance and formed continuously from a peripheral edge of an opening of the one end to a peripheral edge of the opening of the other end thereof;

wherein the nozzle guide is a metal formed body; and wherein the sealing member is a rubber body having fuel permeation resistance.

3. The fuel filler pipe according to claim 1, wherein the nozzle guide includes a first cylinder body including adjacent to an opening of one end thereof the annular covering portion; and a second cylinder body disposed inside an one end side of the first cylinder body and inside the other end side of the fuel filler pipe body, the second cylinder body having a peripheral edge of an opening of one end thereof spaced from a peripheral edge of the opening of the one end of the first cylinder body and having a peripheral edge of an opening of another end thereof connected to an inner circumferential surface of a midsection of the first cylinder body.

4. The fuel filler pipe according to claim 1, wherein:

the annular covering portion includes a notched recess being open in a peripheral edge of an opening of the annular covering portion; and the fuel filler pipe body includes in the outer circumferential surface of the other end side thereof a fitting protrusion configured to fit with the notched recess in the state where the annular covering portion covers the outer circumferential surface of the other end opening side of the fuel filler pipe body.

5. The fuel filler pipe according to claim 1, further comprising a tubular breather tube formed from a resin is arranged in parallel with and lateral to the fuel filler pipe body;
   wherein the breather tube is adapted to connect at one end thereof to the fuel tank and at another end thereof to the other end opening side of the fuel filler pipe body, and the breather tube including a conductive resin tube layer being conductive and forming an outer circumferential surface of the breather tube;
   wherein the fuel filler pipe body includes a resin body inner layer being conductive and forming an inner circumferential surface of the fuel filler pipe body and a resin body outer layer being non-conductive and forming an outer circumferential surface of the fuel filler pipe body, and the fuel filler pipe body is adapted to be secured to a vehicle body by using a metal mounting adapted to contact at least to the outer circumferential surface of the breather tube; and
   wherein the fuel filler pipe body includes on the other end opening side thereof a mounting hole into which an other end side of the breather tube is force-fitted.

6. The fuel filler pipe according to claim 5, wherein:
   the fuel filler pipe body includes on the other end opening side thereof a projecting cylinder portion projecting laterally outwardly and including the mounting hole extending through in a projection direction; and
   the projecting cylinder portion includes a resin cylinder inner layer being conductive, forming an inner circumferential surface of the projecting cylinder portion, and being continuous with the resin body inner layer.

7. The fuel filler pipe according to claim 5, wherein the nozzle guide includes on the one end side thereof a cylindrical nozzle insertion part located inside the other end opening side of the fuel filler pipe body; and
   wherein the nozzle insertion part includes a ground portion extending laterally outwardly and including an extension end adapted to contact to the inner circumferential surface of the fuel filler pipe body.

* * * * *